July 31, 1956 L. PÉRAS 2,756,989
SUSPENSION DEVICE FOR VEHICLES
Filed Aug. 11, 1953
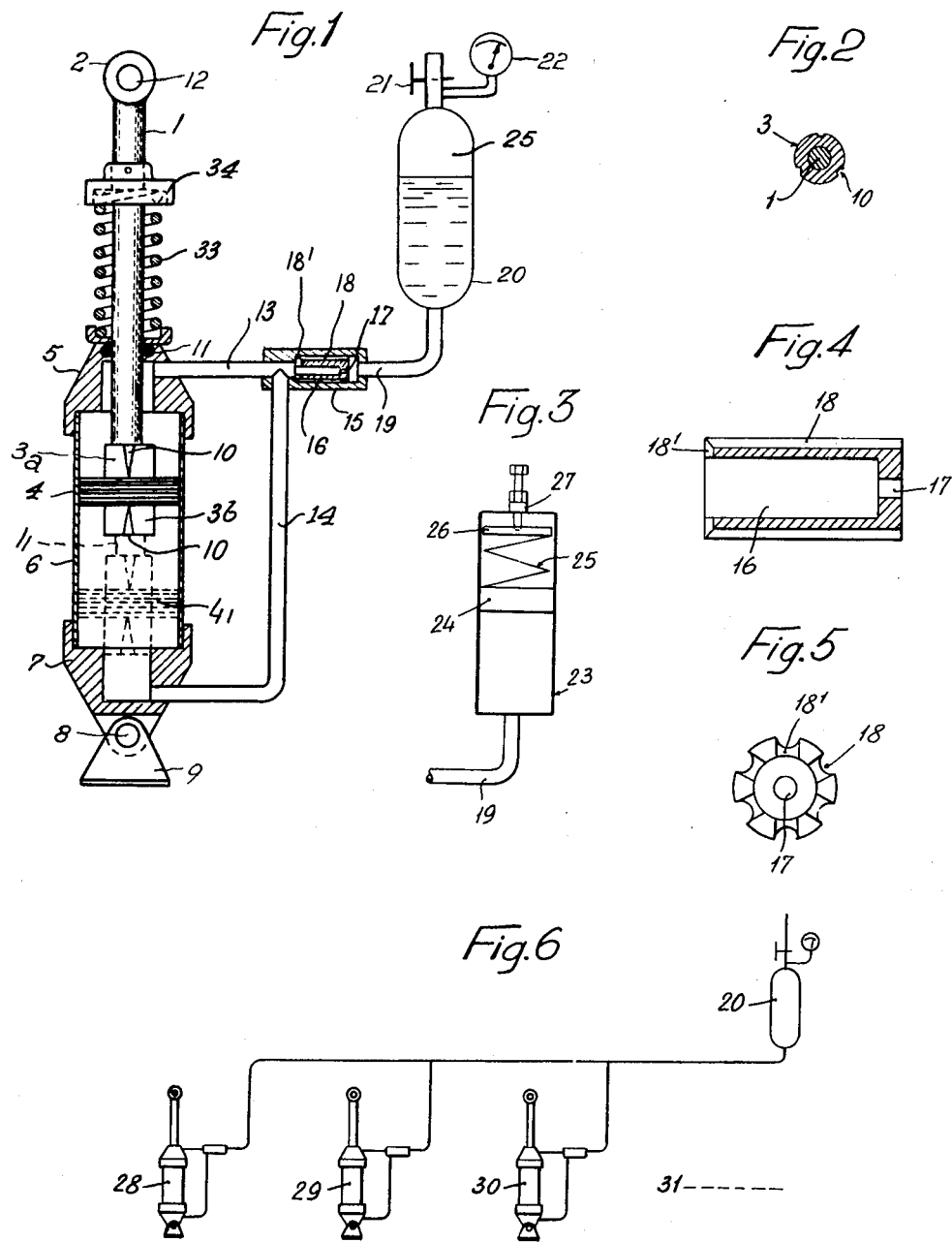

United States Patent Office 2,756,989
Patented July 31, 1956

2,756,989

SUSPENSION DEVICE FOR VEHICLES

Lucien Péras, Billancourt, France, assignor to Regie Nationale des Usines Renault, Billancourt (Seine), France Application August 11, 1953, Serial No. 373,639

Claims priority, application France August 29, 1952

4 Claims. (Cl. 267—34)

The present invention relates to a suspension device of an hydraulic-pneumatic type, designed in particular for the suspension of vehicles, but capable of being utilized as an elastic shock absorber for machines, for example shock machines such as steam hammers, for avoiding the transmission of vibrations to the ground.

The problem of the suspension of road vehicles and aeroplanes, when the latter land or take off, is one of the most difficult of solution.

The known elastic systems were first calculated for horse drawn vehicles.

The insufficiency of leaf springs was compensated by the creation of pneumatic wheels which eliminated slight shocks due to the road, and partially protected the mechanism of the vehicles from destructive shocks.

The increasing desire for comfort induced engineers and designers to consider new technics and to invent devices such as for example variable flexibility, in which the give of the elastic system, under the influence of the load, is not proportional to the latter, and, to cite another example, to aid the shock absorbing action of the friction of the leaves of the springs by the adjustable absorption of the energy by a device known as a shock absorber.

The present invention, in a general sense, provides a combination of a variable flexible elastic system and a shock absorbing device.

It also combines the thermodynamic characteristics of compressed air and the hydrodynamic laws of the flow or discharge of a hydraulic fluid of a given viscosity through calibrated apertures.

In such a system, the part of the apparatus that receives the initial shock must not be subject, to the direct reaction of the compressed air, the elasticity of which is nevertheless indispensable.

The various parts or elements of the vehicle which are brought nearer one another when the wheel is thrown upwards in the direction of the chassis must yield only gradually to cause the tire to take a greater part in the initial blow than it takes in the usual suspension systems.

However, the tire cannot absorb all of the blow, as its pressure would have to be reduced and its cross-section increased to such an extent that there would be a great loss of motive power, owing to the cyclic deformation of the tire casing under the effect of the weight on the wheel.

The object of the present invention is to increase the efficiency of the tire casing by means of an hydrodynamic system, and to replace the spring by a body of compressed air.

By way of example, such a system is described hereafter by reference to Figures 1 to 6 in the annexed drawing.

Fig. 1 represents a schematic cross section of a suspension unit comprising the cylinder associated with the suspended parts, a special valve and a reservoir of compressed air which can be placed on the body, chassis, or axles of the vehicle.

Fig. 2 is a cross section of the piston rod.

Fig. 3 is a variation of the elastic system wherein the reservoir is replaced by a cylinder comprising a spring resting on a free piston which floats on the surface of the liquid.

Fig. 4 is a longitudinal section of the special valve.

Fig. 5 is an end view of the special valve.

Fig. 6 is a diagrammatic view of a vehicle suspension system comprising a plurality of elements associated with a single air reservoir.

The cylinder containing the hydraulic fluid is defined by a tube 6, the extremities of which are set or screwed into heads 5 and 7, the lower head being equipped with a yoke and an eye which allow the connection of head 7 by means of a pin 8 with a bracket 9 fixed to one of the parts, the axle support for example.

The large grooved piston 4 is solid with two small pistons 3a and 3b, placed respectively on its upper and lower face, and a rod 1 which carries at its extremity a head 2 and an eye 12, which can receive a pin for connecting the piston to the body or the chassis of the vehicle.

Alternatively, the bracket 9 can be fixed to the chassis, while the pin, passing through the eye 12 is connected to the wheel or more exactly to the hub of the wheel, a part not suspended.

Spring 33 serves as an element for restoring the piston to the position of equilibrium, the tension of said spring can be adjusted by moving the base 34 which serves as an upper support of said spring, the lower extremity of which rests on the head of 5.

Pistons 4 and 3a—3b are of different cross sections, which causes, during the stroke of the pistons, the displacement of different volumes of liquid and therefore the bringing about of the compression of air or the spring 25 of Fig. 3. The progressive introduction of piston rod 1 into the cylinder 6 accentuates this effect.

Fig. 2 shows that pistons 3a and 3b comprise grooves 10, the cross sections of which increase in area from the common faces of the large piston 4 up to the end faces of pistons 3a and 3b. Said grooves are calibrated according to the viscosity of the hydraulic fluid utilized.

Fluid-tightness of head 5 around piston rod 1 is assured by stuffing box 11 suitably formed with a ring of a plastic material such as a superpolyamide resin.

The cavity bored into the upper part of head 5 is connected by tube 13 to the body of valve 15 which also receives tube 14 which connects tube 13 to the chamber formed in the lower head 7 of the apparatus and tube 19 which connects valve 15 to reservoir 20.

The latter is equipped with an inlet 21 and pressure gauge 22, serving for filling the reservoir with compressed air at a given pressure, in function of the load which the suspension element must support.

The body of valve 15 comprises a mobile valve member 16 formed from an appropriate metal or from a plastic such as superpolyamide resin.

Figures 4 and 5 show the radial grooves 18[1] and longitudinal conduits 18 which allow the flow of the fluid at the beginning of the movement, when valve member 16 is in the position shown in Fig. 1. At the end of the opposite stroke, conduits 18 are closed by the base of the cavity which receives the valve member, as seen at the right of Fig. 1. At this moment, the calibrated hole 17 alone permits the flow of the fluid and the transmission of the pressure.

The reservoir 20 can be replaced, as shown in Fig. 3, by a cylinder 23 in communication with free air, equipped with two free pistons 24 and 26, between which is comprised spring 25, said spring being metallic or of a material with a rubber base.

Piston 24 maintains without leakage the pressure of the spring on the hydraulic fluid contained in the lower part of cylinder 23. The upper part of the cylinder receives a set screw 27 which stops piston 26 in a given position, thus effecting a predetermined and adjustable strain corresponding to the static load of the suspension element.

The operation of the device is as follows:

If it is assumed that a shock caused by a stone, bump, or the like, forces the wheel of the vehicle to approach the chassis, the center of gravity of which has a tendency, by reason of the well known principle, to conserve its previous trajectory, assumed to be horizontal, there results a contraction of the assembly comprising piston 4, cylinder 6.

Piston 4 descends into the cylinder from the position shown in Fig. 1, forcing the liquid under the lower faces of the large piston 4 and small piston $3b$. The volume of fluid displaced by piston 4 in its movement towards the base is greater than that swept by the assembly of the piston and its rod 1, therefore there is not a simple movement of fluid through conduits 14 and 13 and each cubic centimeter of liquid does not pass integrally from the lower to the upper face of the pistons.

Owing to the volumes being different, the liquid driven at the beginning must find an exit by valve 15 and said liquid cannot circulate except through conduits $18^1$ and 18 and hole 17. It therefore enters reservoir 20 where it compresses air 25.

The movement of the fluid towards reservoir 20 is slightly hindered owing to the position taken by valve 16 which is displaced towards the right (Fig. 1) leaving for the flow of fluid only the calibrated hole 17, in view of the fact that conduits 18 and $18^1$ are closed against the circular surface of cylinder 15.

If the movement continues, eventually piston $3b$ penetrates into the recess defined in lower head 7. The movement is then braked by the action of the cylindrical faces of piston 4 and its packing rings against the main cylinder 6 and by cylinder $3b$ against the side surface of the recess in head 7 into which it penetrates; the liquid compressed under 4 in position $4^1$ for example, evacuates by conduits 10, the form of which is sufficiently indicated in elevation in Fig. 1.

The progressive braking due to this evacuation owing to the form of conduits 10, also contributes to slowing the movement before piston 4 has reached the position at the end of the lower stroke.

The displacement of the liquid can be adjusted by giving a greater or lesser diameter to the rod 1 of piston 4 in order to accentuate or lessen the differential effect of the movement.

The system therefore operates at a slightly increasing pressure, which has the effect of dissipating the energy causing the contraction in the path followed by the liquid and especially in the elbows and tubes 14 and 13. The reaction effort, i. e. the energy by the elastic cushion in the reservoir 20, is therefore relatively small and therefore the impact of the wheel onto level ground is relatively weak.

It is well known that such shocks are particularly injurious to the mechanism and the passengers, as they correspond to important vertical accelerations, the value of which can be calculated according to the theory of percussions, considering the mass of the ground as infinite. The principle of every classic spring-shock absorber system consisted for a long time of "yielding" under the obstacle and of braking the return of the wheel to the ground. The present invention provides a better system, which limits the effort controlling the return of the wheel to the ground, at a reasonable value.

The return of the system to a normal position in a movement of extension, under the effect of the increased pressure of compressed air in reservoir 25, is largely facilitated by the displacement of valve 16 towards the left of its chamber 15, in such a position that the fluid flows rapidly through conduits 18 and $18^1$ and hole 17.

The results obtained can vary according to the dimensions of the valve and the calibration of the orifices.

The operation of the assembly is also affected by the respective volumes of liquid and air, and therefore, of the reservoir, which must result from calculations and tests according to the characteristics of the suspension desired.

Fig. 6 shows the utilization of 2, 3 or 4 or $n$ elements of suspension 28—29—30—31—etc., which can operate in parallel with a single air reservoir 20, assuring by itself a coordination comparable to that obtained by torsion bars or coupling between wheels.

It is evident that the form of coupling can be limited to two wheels by placing two independent reservoirs for the suspension of a four wheeled vehicle for example.

I claim:

1. A suspension device for vehicles comprising, in combination, a cylinder and a piston slidable therein, said piston having a piston rod extending from the cylinder, said cylinder and said piston rod being adapted to be connected to parts of the vehicle to provide a resilient suspension therebetween, an upper smaller piston and a lower smaller piston integral with said first-named piston and disposed on opposite faces thereof, said smaller pistons having a lesser diameter than said first-named piston, means defining recessed chambers at each end of said cylinder for reception of said smaller pistons upon reciprocation of said first-named piston from one end of said cylinder to the other end thereof, a valve, and fluid conduit means connecting one end of said valve to the recessed chambers at each end of said cylinder, a reservoir for receiving liquid from said valve, means connecting said reservoir with the end of said valve opposite said fluid conduit means, said reservoir accommodating means for resiliently acting upon the liquid accumulated therein.

2. A suspension device for vehicles as defined in claim 1, wherein each of said smaller pistons is formed with longitudinal grooves increasing in width from the face of the first-named piston to the outer face of the smaller piston.

3. A suspension device for vehicles as defined in claim 1, wherein said valve comprises a valve body having a hollow valve member slidable axially therein between the end of said valve body communicating with said fluid conduit means and the end of said valve body communicating with said reservoir, said valve member having a calibrated central orifice and longitudinal external conduits, said longitudinal conduits being closed when said valve member is urged against the end of the valve body communicating with said reservoir.

4. A suspension device for vehicles as defined in claim 1, further comprising means normally urging said piston rod out of said cylinder, said means being mounted on said piston rod and an adjustable collar carried by said piston rod and bearing against said means.

References Cited in the file of this patent

UNITED STATES PATENTS

| 1,002,821 | Cowles et al. | Sept. 12, 1911 |
| 1,045,136 | Flentje | Nov. 26, 1912 |
| 2,333,096 | Dowty | Nov. 2, 1943 |
| 2,357,505 | Crispell | Sept. 5, 1944 |

FOREIGN PATENTS

| 430,337 | Great Britain | June 13, 1935 |